(12) United States Patent
Kubo et al.

(10) Patent No.: US 11,386,275 B2
(45) Date of Patent: Jul. 12, 2022

(54) MENU GENERATION SYSTEM

(71) Applicant: Gurunavi, Inc., Chiyoda-ku (JP)

(72) Inventors: Seiichiro Kubo, Chiyoda-ku (JP);
Makito Chiba, Chiyoda-ku (JP);
Hiroto Sumida, Chiyoda-ku (JP);
Koichiro Nakayama, Chiyoda-ku (JP)

(73) Assignee: Gurunavi, Inc., Chiyoda-ku (JP)

( * ) Notice: Subject to any disclaimer, the term of this patent is extended or adjusted under 35 U.S.C. 154(b) by 105 days.

(21) Appl. No.: 15/515,698

(22) PCT Filed: Sep. 29, 2015

(86) PCT No.: PCT/IB2015/001721
§ 371 (c)(1),
(2) Date: Mar. 30, 2017

(87) PCT Pub. No.: WO2016/051252
PCT Pub. Date: Apr. 7, 2016

(65) Prior Publication Data
US 2017/0315989 A1 Nov. 2, 2017

(30) Foreign Application Priority Data

Sep. 30, 2014 (JP) .............................. JP2014-213139

(51) Int. Cl.
*G06F 40/00* (2020.01)
*G06F 40/58* (2020.01)
(Continued)

(52) U.S. Cl.
CPC ............ *G06F 40/58* (2020.01); *G06F 3/0482* (2013.01); *G06F 40/40* (2020.01); *G06Q 50/12* (2013.01)

(58) Field of Classification Search
CPC ...... G06F 17/28; G06F 17/289; G06F 3/0482; G06F 40/58; G06F 40/40; G06Q 50/12
See application file for complete search history.

(56) References Cited

U.S. PATENT DOCUMENTS 5,832,446 A * 11/1998 Neuhaus ................. G06F 16/40
705/15
6,871,325 B1 3/2005 McNally et al.
(Continued)

FOREIGN PATENT DOCUMENTS

FR 2 956 497 A1 8/2011
JP 5-151253 A 6/1993
(Continued)

OTHER PUBLICATIONS

Office Action dated Jul. 30, 2018 in Korean Patent Application No. 10-2017-7008465 (with English language translation), 9 pages.
(Continued)

*Primary Examiner* — Cesar B Paula
*Assistant Examiner* — David Faber
(74) *Attorney, Agent, or Firm* — Oblon, McClelland, Maier & Neustadt, L.L.P.

(57) ABSTRACT

A menu generation system including a menu item information storage that stores menu information for each restaurant, a menu item property master storage that stores menu item properties including at least any one set of a plurality of ingredients that are used in menu items, a plurality of seasonings that are used in the menu items or a plurality of cooking styles of the menu items, processing circuitry that receives a request to edit a menu item property in the first language, consults the menu item property master storage, extracts choices of menu item properties, causes the extracted choices to be displayed, and receives input of a selected choice from among the displayed choices.

13 Claims, 13 Drawing Sheets

(51) Int. Cl.
*G06F 40/40* (2020.01)
*G06F 3/0482* (2013.01)
*G06Q 50/12* (2012.01)

(56) References Cited

U.S. PATENT DOCUMENTS

| | | | | |
|---|---|---|---|---|
| 7,197,705 | B1* | 3/2007 | Nagae | G06Q 10/107 715/205 |
| 7,801,721 | B2* | 9/2010 | Rosart | G06F 40/103 704/277 |
| 8,903,708 | B2* | 12/2014 | Derks | G06Q 30/02 704/277 |
| 2006/0080605 | A1* | 4/2006 | Chang | G06F 9/454 715/703 |
| 2007/0239588 | A1* | 10/2007 | Kilgore | G06Q 40/04 705/37 |
| 2008/0288474 | A1* | 11/2008 | Chin | G06F 16/951 |
| 2009/0018916 | A1* | 1/2009 | Seven | G06Q 30/02 705/14.27 |
| 2009/0063128 | A1* | 3/2009 | Seo | G06F 40/56 704/4 |
| 2009/0240591 | A1* | 9/2009 | Wartersian | G06Q 30/02 705/15 |
| 2010/0094715 | A1* | 4/2010 | Kim | G06Q 30/0251 705/15 |
| 2012/0323707 | A1* | 12/2012 | Urban | G06Q 30/06 705/15 |
| 2013/0159108 | A1* | 6/2013 | DesRosiers | G06F 16/951 705/14.57 |
| 2013/0211814 | A1* | 8/2013 | Derks | G06Q 50/12 705/15 |
| 2013/0300748 | A1* | 11/2013 | Yaeda | G06T 11/00 345/467 |
| 2013/0304590 | A1* | 11/2013 | Motenko | G06Q 50/12 705/15 |
| 2014/0081620 | A1* | 3/2014 | Solntseva | G06F 40/40 704/3 |
| 2014/0222413 | A1* | 8/2014 | Rossmann | G06F 3/0488 704/3 |
| 2014/0280295 | A1* | 9/2014 | Kurochkin | G06F 16/3337 707/769 |
| 2014/0282265 | A1* | 9/2014 | Shaich | G06F 3/0482 715/841 |
| 2015/0154690 | A1* | 6/2015 | Park | G06Q 30/0643 705/27.2 |

FOREIGN PATENT DOCUMENTS

| | | |
|---|---|---|
| JP | 5-324719 A | 12/1993 |
| JP | 10-49185 A | 2/1998 |
| JP | 2002-297733 A | 10/2002 |
| JP | 2009-134588 A | 6/2009 |
| JP | 2013-175062 A | 9/2013 |
| JP | 5422775 B1 | 2/2014 |
| JP | 5449633 B1 | 3/2014 |
| JP | 2015-194857 A | 11/2015 |
| KR | 10-2002-0038671 A | 5/2002 |
| KR | 10-2010-0040069 A | 4/2010 |
| KR | 10-2010-0125789 A | 12/2010 |
| KR | 10-2011-0048410 A | 5/2011 |
| KR | 10-2014-0100208 A | 8/2014 |

OTHER PUBLICATIONS

International Search Report dated Feb. 12, 2016 in PCT/IB2015/001721 filed Sep. 29, 2015, 3 pages.
Japanese Office Action dated Mar. 10, 2015 in JP 2014-213139 filed Sep. 30, 2014 (with English translation), 6 pages.
Japanese Office Action dated Nov. 10, 2015 in JP 2015-180050 (with English translation), 3 pages.
Written Opinion of the International Preliminary Examining Authority dated Sep. 13, 2016 in PCT/IB2015/001721 filed Sep. 29, 2015, 5 pages.
Office Action dated Apr. 29, 2019 in Korean Application No. 10-2017-7008465, along with an English translation.
Office Action dated Jun. 14, 2019 in Korean Application No. 10-2019-7015461, along with an English translation.
Korean Office Action dated Mar. 5, 2020 in Korean Patent Application No. 10-2019-7015461 (with English translation), 6 pages.
Korean Notice of Dismissal of Amendment dated Mar. 5, 2020 in Korean Patent Application No. 10-2019-7015461 (with English translation), 7 pages.
Notice of Preliminary Rejection dated Oct. 19, 2020 in corresponding Korean Patent Application No. 10-2020-7009921 (with English translation)(11 pages).
Notice of Reasons for Refusal dated Jan. 12, 2021 in corresponding Japanese Patent Application No. 2017-209883 (with English translation)(22 pages).
KIPO's Notice of Final Rejection dated Jan. 31, 2019 in corresponding Korean Patent Application No. 10-2017-7008465 (with English translation)(4 pages).
Notification of the First Office Action dated Aug. 28, 2020 in corresponding Chinese Patent Application No. 201580047529.1 (with English translation)(17 pages).

* cited by examiner

FIG. 6

MENU ITEM NAME

IMAGE  UPLOAD

CATEGORY  SELECT CATEGORY

MENU ITEM INTRODUCTION

INGREDIENT

EDIT INGREDIENT

SEASONING

EDIT SEASONING

COOKING STYLE

EDIT COOKING STYLE

FIG. 7

```
MENU ITEM NAME
  MAGURONOAKAFUJIMORI IN JAPANESE
  MAGURONOAKAFUJIMORI IN KATAKANA

IMAGE   UPLOAD

CATEGORY   SELECT CATEGORY

MENU ITEM INTRODUCTION

INGREDIENT
                              EDIT INGREDIENT
SEASONING
                              EDIT SEASONING
COOKING STYLE
                              EDIT COOKING STYLE
```

Name  MAGUROAKAFUJIMORI
Name  まぐろ赤富士盛り
(In Japanese)
Category  Sashimi
Explanation  Sashimi and (sashimi) is a japanese food to eat it with seasonings such as soy sauce, vinegared miso that was cut into small pieces and the raw ingredients of seafood, served with condiments such as wasabi ginger.
Cooking  raw meals
ingredients  Tuna
Price  1,000Yen(w/o tax)

MENU GENERATION SYSTEM

BACKGROUND OF THE INVENTION

1. Field of the Invention

The invention relates to a menu generation system that generates a menu to be presented to a foreign quest at a restaurant.

2. Description of Related Art

In recent years, foreigners who visit Japan have been increasing, and quite a lot of foreigners come to restaurants. Foreigners who understand Japanese order at restaurants without any trouble; however, for foreigners who do not understand Japanese or little understand Japanese, it is not easy to order. Some restaurants have a menu in a foreign language, such as English, for foreigners.

Japanese Patent Application Publication No. 10-49185 (JP 10-49185 A), Japanese Patent Application Publication No. 2002-297733 (JP 2002-297733 A) and Japanese Patent Application Publication No. 2013-175062 (JP 2013-175062 A) describe systems that generate a menu, or the like, in a foreign language at each restaurant.

SUMMARY OF THE INVENTION

JP 10-49185 A describes the invention of a menu item explanation system that reproduces detailed explanation information of items listed in a menu by foreign-language voice. If this system is used, the foreign-language voice echoes therearound, with the result of an inconvenience of guests sitting therearound. In addition, each restaurant is required to prepare detailed explanation information; however, there is often no staff who has a good command of a foreign language at a restaurant. Therefore, it can be difficult to prepare explanations of menu items.

JP 2002-297733 A describes the following invention. A menu item explanation consisting of Japanese and English is prepared for each menu item, and is stored in advance in a handy terminal that is used by a waitperson. When the waitperson serves a foreign guest, the waitperson displays the English menu item explanation on the handy terminal through predetermined operation and then shows the English menu item explanation to the foreign guest. Even in this case, each restaurant is required to enter menu item explanations into the handy terminal in advance as in the case of JP 10-49185 A; however, there is often no staff who has a good command of English at a restaurant. For this reason, it can be difficult to prepare menu item explanations.

JP 2013-175062 A describes the following invention. A foreign-language menu is displayed on a ticket-vending machine intended for a restaurant by connecting a license kit to the ticket-vending machine. The license kit stores multilingual software. In this case, because the license kit is prepared by a ticket-vending machine maker, or the like, any staff is allowed to serve a foreign guest if there is no staff who has a good command of a foreign language at a restaurant. However, it is required to purchase the license kit that stores multilingual software or the license kit is not compatible with a restaurant-specific menu item, or the like.

In recent years, when foreigners look for restaurants, the foreigners not only use a guide book, or the like, but also often use a website that provides restaurant information on the Internet. The webpages of restaurants found from the website that provides restaurant information provide not only a shop name, a location, contact information, and the like, but also information about menu items, and the like. Then, if the webpages of restaurants provide a menu in a foreign language, an appeal to foreigners becomes effective. In addition, if such a menu is shown to a foreigner who actually comes to a restaurant, it is easy for the foreigner to order.

In order to achieve this object, it is conceivable to provide the webpages of restaurants in a foreign language by using an automatic translation site, or the like; however, there is an inconvenience in the accuracy, or the like, of automatic translations when Japanese menus are automatically translated. Particularly, menus at restaurants can be used by people who restrict ingredients, cooking styles, seasonings, or the like, because of, for example, the reason of religion, belief, health (such as allergy), or the like. For example, vegetarians avoid animal products.

A foreigner who has a good command of Japanese is able to ask a staff; otherwise, it is difficult to ask a staff. Even when menu item names, and the like, are translated by using an automatic translation site, or the like, unless ingredients, cooking styles, and the like, are accurately translated, the translated names, and the like, mislead foreigners, with the result of a possible trouble with a restaurant. In this way, when ingredients, cooking styles, and the like, are restricted, translations should be accurately expressed in order to make foreigners understand. Therefore, when the entire webpage including a menu is translated by using an automatic translation site, or the like, and then the translated information is merely provided, it is actually undesirable because there is room for misunderstanding foreigners.

In this way, if a foreign-language menu is provided, menu item explanations about ingredients, cooking styles, and the like, which are subjects of taboos or restrictions due to religion, belief, health, or the like, should be accurately informed to foreigners who order. If menu item explanations are merely translated into foreign-language words, a staff who takes an order may erroneously understand the details of an order, so the staff is required to be able to accurately understand the details of an order made by a foreigner. On the other hand, because the menu of each restaurant represents the feature, and the like, of the restaurant, the viewpoint of appealing to guests by allowing an appeal unique to each restaurant is also required. That is, information should be accurately informed, while the flexibility of how to express the information should be maintained. Such mutually contradicting objects should be achieved. To achieve the above, translations made by a staff who has a good command of a foreign language are required as described above; however, not all the restaurants can provide such translations. Therefore, a method of generating a foreigner-oriented menu that is able to make foreigners accurately understand a menu item is desired with a simple method even when there is no staff who has a good command of a foreign language.

Considering the above task, the inventors invented a menu generation system that is able to make foreigners understand a menu item with a simple method even when there is no staff who has a good command of a foreign language.

An aspect of the invention provides a menu generation system that generates a menu of a restaurant in multiple languages includes: a menu item information storage unit that stores menu information for each restaurant; a menu item property master storage unit that stores menu item properties including at least any one set of a plurality of ingredients that are used in menu items, a plurality of seasonings that are used in the menu items or a plurality of cooking styles of the menu items; a menu item property processing unit that receives a request to edit a menu item property in the first language, consults the menu item property master storage unit, extracts choices of menu item properties, causes, the extracted choices to be displayed, and receives input of a selected choice from among the displayed choices; a corresponding foreign-language term storage unit that stores a correspondence relation between the menu item property in the first language and the menu item property in at least one second language; an input information foreign-language word conversion unit that converts the received menu item property in the first language to the menu item property in the second language on the basis of the correspondence relation stored in the corresponding foreign-language term storage unit; a menu item information processing unit that stores the converted menu item property in the second language in the menu item information storage unit as the menu item information; and a menu item information display unit that, in response to a request to display a menu item from an information terminal, consults the menu item information storage unit, displays menu item information, including the converted menu item property in the second language, on the information terminal. The information terminal is a restaurant terminal that is used at the restaurant or a computer that is used by a guest.

In the above aspect, the menu generation system may further include a menu item category input receiving unit that receives input of a selected menu item category. The menu item property master storage unit may store a menu item category and a menu item property in the first language in association with each other. The menu item property processing unit may extract the menu item property corresponding to the received menu item category from the menu item property master storage unit, and receive the extracted menu item property as the menu item property in the first language.

In the above aspect, the menu generation system may further include a menu item introduction master storage unit that stores a menu item category and a menu item introduction in the first language in association with each other; and a menu item introduction processing unit that extracts a menu item introduction corresponding to the received menu item category from the menu item introduction master storage unit, and that receives the extracted menu item introduction as the menu item introduction in the first language. The corresponding foreign-language term storage unit may store a correspondence relation between the menu item introduction in the first language and the menu item introduction in the second language, in addition to the menu item property. The input information foreign-language word conversion unit may convert the menu item property, to which the revision has been received, to the menu item property in the second language on the basis of the correspondence relation stored in the corresponding foreign-language term storage unit. The menu item information processing unit stores in the menu item information storage unit as the menu item information, menu item information including the converted menu item introduction in the second language as well as the menu item property. In the above aspect, the menu generation system may further include an automatic translation unit that translates the first language to the second language. The menu item introduction processing unit may be able to, in response to a request from a restaurant terminal that is used at the restaurant, receive a revision to the received menu item introduction in the first language. When a revision to the menu item introduction in the first language is received, the automatic translation unit may automatically translate the menu item introduction, to which the revision has been received, to the menu item introduction in the second language. When the revision to the menu item introduction is received, the menu item information display unit may display the automatically translated menu item introduction in the second language as the menu item introduction included in the menu item information. In the above aspect, the menu item property processing unit may be able to receive a request to revise the menu item property in the first language from a restaurant terminal that is used at the restaurant. When the menu item property processing unit receives a request to revise the menu item property, the menu item property processing unit may extract choices of the menu item property in the first language to be revised by consulting the menu item property master storage unit, and may receive a revision to the extracted choices from the restaurant terminal. The input information foreign-language word conversion unit may convert the menu item property, to which the revision has been received, to the menu item property in the second language on the basis of the correspondence relation stored in the corresponding foreign-language term storage unit. When the revision to the menu item property is received, the menu item information display unit may display the converted menu item property in the second language as the menu item property included in the menu item information.

With the configuration according to the above aspect, even when there is no staff who has a good command of a foreign language, it is possible to generate a foreign-language menu with a simple method. Particularly, in the above aspect, the menu item name is shown in writing that allows pronunciation in the first language, such as Roman alphabet, and, when the menu item introduction is revised, the details of the revision is automatically translated into a menu item introduction in the foreign language, and a menu item property is received by making a selection and displayed in the corresponding foreign language.

It is a matter of an order with a foreign-language menu that a staff takes a wrong order. Particularly, if a menu item name is literally translated into a menu item name in a foreign language, a staff who takes an order is difficult to understand which menu item is an ordered menu item, so there is a concern about a wrong order. Therefore, a menu item name is shown in writing that allows even a foreigner to pronounce the menu item name in the first language, so even a foreigner is able to directly order through pronunciation in the first language. With the above configuration, it is possible to prevent a wrong order.

The menu item properties, such as an ingredient, a cooking style and a seasoning, are often subjects of taboos or restrictions due to religion, belief, health, or the like. Therefore, accuracy is important, and writing, or the like, that leads to ambiguity or misunderstanding should be avoided. If the menu item property is freely input at a restaurant and is automatically translated, there is a possibility that writing leads to ambiguity or misunderstanding. In addition, information of the menu item property is typical information. Therefore, in the above aspect, the flexibility of a restaurant is intentionally limited for the menu item property, and the menu item property is input in an alternative form. Thus, writing that leads to ambiguity or misunderstanding is excluded. With this configuration, it is possible to avoid the situation that a foreigner orders an ingredient, or the like, which is a subject of taboos or restrictions due to the reason of religion, belief, health, or the like.

The menu item introduction describes how to eat the menu item, the feature of the menu item, and the like, so the menu item introduction is untypical information. Therefore, it is difficult to input the menu item introduction in an alternative form, and information regarding taboos or restrictions is described in the menu item explanation in the menu item property, so there is a low possibility of a negative effect even when free input of a menu item introduction is received and then an automatic translation of the menu item introduction is used. Therefore, free input of a menu item introduction in the first language is received as needed, and the menu item introduction is automatically translated. Thus, it is possible to provide untypical information to a foreigner as well.

In this way, in the above aspect, the characteristics of the menu item name, menu item introduction and menu item property in a menu are considered, and then suitable processes for the menu item name, menu item introduction and menu item property are executed, thus making it possible to generate a foreign-language menu with an optimal method.

In the above aspect, by selecting a menu item category, it is possible to automatically set a menu item introduction, a menu item property, and the like, as default settings. This reduces a burden on input at a restaurant, and allows the restaurant to use details set in advance, so this also leads to prevention of erroneous input, or the like.

With the menu generation system according to the aspect of the invention, even when there is no staff who has a good command of a foreign language, it is possible to make a foreigner understand a menu item with a simple method. Because it is possible to accurately display an ingredient, a cooking style, and the like, on a menu, it is less likely to have a trouble with a guest. In addition, because a menu item name is displayed in writing that allows even a foreigner to pronounce the menu item name in the first language, there is a low possibility of making a wrong order.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a view that schematically shows an example of a management window;

FIG. 7 is a view that schematically shows an example of a state where a menu item name is input into the management window;

DETAILED DESCRIPTION OF EMBODIMENTS

Figure 1:
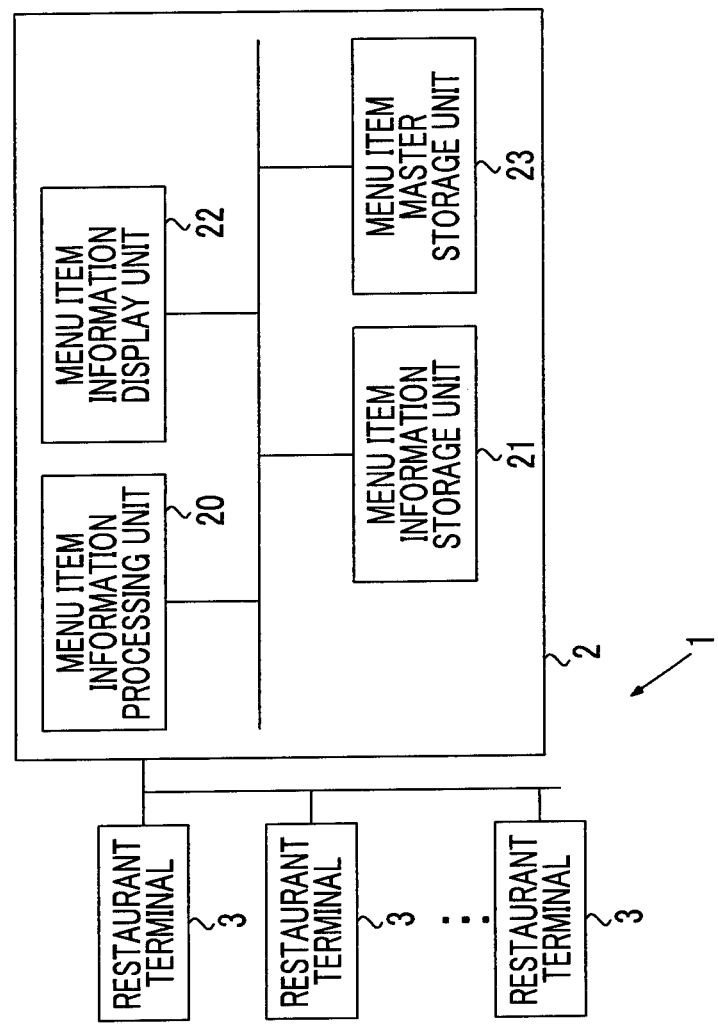
FIG. 1 is a conceptual view that schematically shows an example of the system configuration of a menu generation system according to a first embodiment of the invention.
Figure 2:
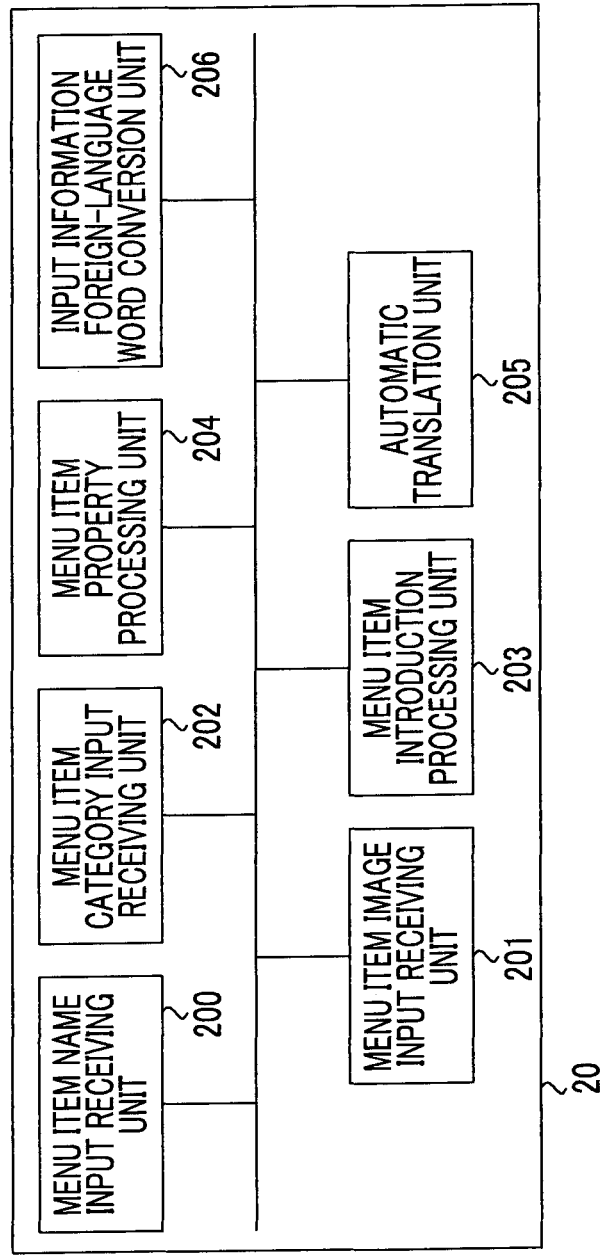
FIG. 2 is a conceptual view that schematically shows an example of the configuration of a menu item information processing unit.
Figure 3:
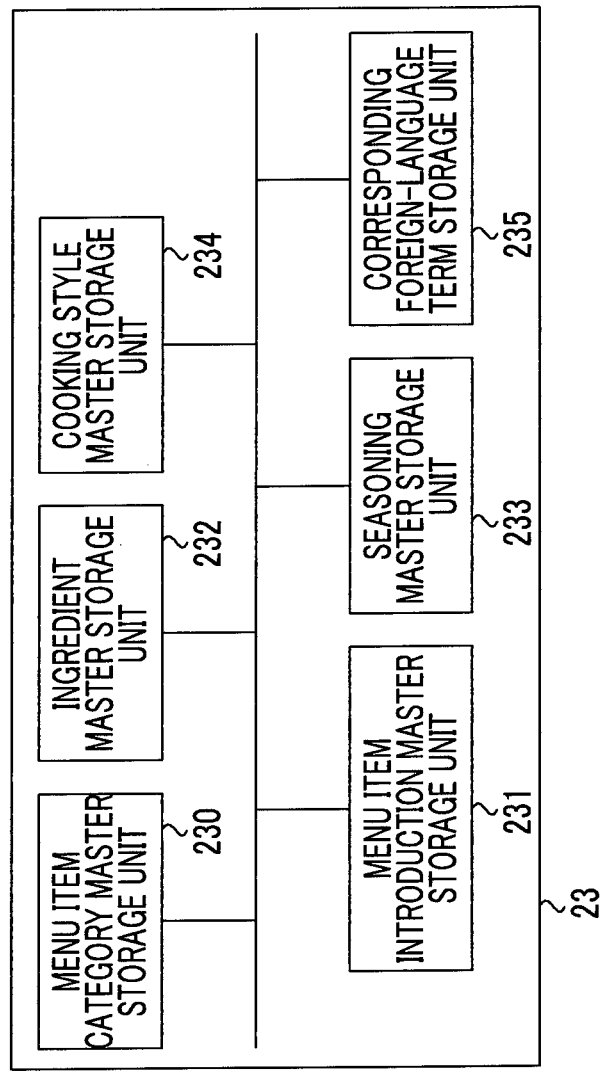
FIG. 3 is a conceptual view that schematically shows an example of the configuration of a menu item master storage unit.

FIG. 1 shows an example of the overall system configuration of a menu generation system 1 according to a first embodiment of the invention. FIG. 2 shows an example of the configuration of a menu item information processing unit 20 (described later) in the menu generation system 1. FIG. 3 shows an example of the configuration of a menu item master storage unit 23 (described later) in the menu generation system 1.

Figure 4:
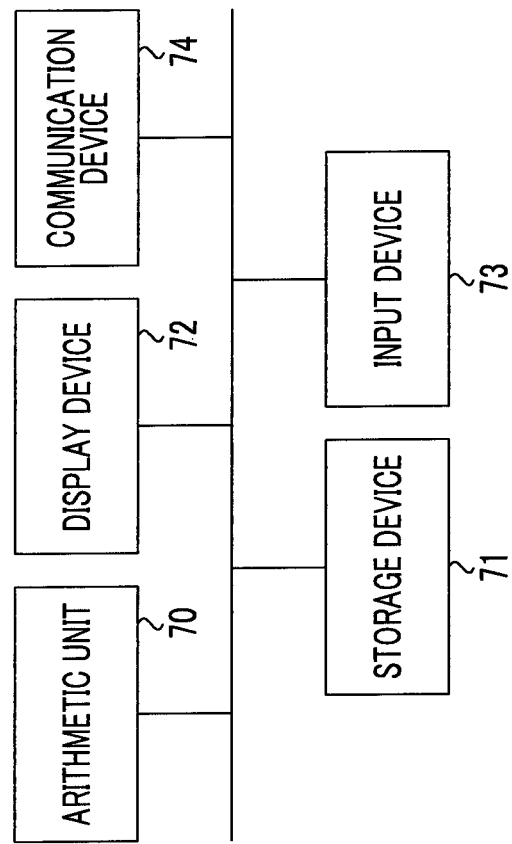
FIG. 4 is a view that schematically shows an example of the hardware configuration of a computer that causes the menu generation system according to the first embodiment of the invention to function.

The menu generation system 1 is implemented by a computer including a server, and the like. FIG. 4 shows an example of the hardware configuration of the computer. The computer includes an arithmetic unit 70, a storage device 71, a display device 72, an input device 73, and a communication device 74. The arithmetic unit 70 is, for example, a CPU, and executes arithmetic processing in accordance with a program. The storage device 71 is, for example, a RAM or a hard disk, and stores information. The display device 72 is, for example, a display, and provides a display image. The input device 73 is, for example, a keyboard or a touch panel for input. The communication device 74 exchanges the results processed by the arithmetic unit 70 and information stored in the storage device 71 with another computer.

The units according to the first embodiment of the invention may be just logically distinguished in function from one another, and may constitute the same area physically or practically. The functions of the menu generation system 1 according to the first embodiment of the invention may be implemented by a single server or may be distributed to two or more servers. Part or all of the functions according to the first embodiment of the invention may be implemented by a computer (including a portable communication terminal, such as a cellular phone) that is used by a user who searches for restaurants. Particularly, the processing of an automatic translation unit 205, input information foreign-language word conversion unit 206, menu item information display unit 22 (described later), and the like, may be executed by a user's computer. Thus, it is possible to reduce the processing load of an administrative server 2.

The administrative server 2 including the functions of the menu generation system 1 is able to exchange information with restaurant terminals 3 via a network, such as the Internet. the restaurant terminals 3 are computers that are respectively used at restaurants. Each of the restaurant terminals 3 just needs to be a computer, and includes not only a personal computer but also a portable communication terminal, and the like. The portable communication terminal includes a cellular phone including a smartphone, a PHS, a tablet computer, and the like. It is desirable that the menu generation system 1 be provided to restaurants that are franchisees of a company, or the like, that provides information about restaurants; however, the provider of the menu generation system 1 is not limited to the company, or the like.

The administrative server 2 in the menu generation system 1 includes the menu item information processing unit 20, a menu item information storage unit 21, the menu item information display unit 22 and the menu item master storage unit 23.

The menu item information processing unit 20 receives the input of information about a menu item that is provided at a restaurant. The menu item information processing unit 20 causes the menu item information storage unit 21 (described later) to store input information received in each of the processing units as menu item information. The menu item information processing unit 20 receives the input of a menu item name in writing that allows even a foreigner to pronounce the menu item name in a first language (a language (including an official language) in a country in which the menu generation system 1 is operating), for example, in Roman alphabet for Japanese. The menu item information processing unit 20 receives free input of a menu item introduction in the first language (for example, Japanese) as needed, and receives the input of each menu item property in an alternative form as needed. When it is desired to change a menu item introduction determined in advance, the menu item information processing unit 20 receives the input of the change and automatically translates the changed menu item introduction into a menu item introduction in a foreign language, and then automatically converts the menu item properties to corresponding foreign-language words. The information about a menu item includes information, such as a menu item name, a menu item introduction and menu item properties. The case where Japanese is the first language, which is the language in the country in which a service using the menu generation system 1 is rolled out, will be described. However, when the service is rolled out in another country, a language that is used in that country may be used as the first language. A second language means one or multiple languages (foreign languages for that country) other than the first language.

The menu item information processing unit 20 includes a menu item name input receiving unit 200, a menu item image input receiving unit 201, a menu item category input receiving unit 202, a menu item introduction processing unit 203, a menu item property processing unit 204, automatic translation unit 205 and the input information foreign-language word conversion unit 206.

The menu item name input receiving unit 200 receives the input of Japanese and katakana as a menu item name. The menu item name input receiving unit 200 converts the received menu item name in katakana to the menu item name in Roman alphabet that allows even a foreigner to pronounce the menu item name in Japanese. At this time, the menu item name input receiving unit 200 may also receive the input of menu item description information, such as an English word that describes the menu item, for example, tempura, sushi, beef steak, curry, or pizza. The menu item name input receiving unit 200 may not receive the input of katakana and then convert the katakana to Roman alphabet, but the menu item name input receiving unit 200 may receive the input of a Japanese menu item name in Roman alphabet. Any writing that allows pronunciation in Japanese (first language) other than the Roman alphabet may be employed.

The menu item image input receiving unit 201 receives the input of menu item image information.

The menu item category input receiving unit 202 receives the input of a selected category to which the menu item belongs. Categories to be selected are stored in a menu item category master storage unit 230 of the menu item master storage unit 23 (described later). The menu item category input receiving unit 202 displays choices by consulting the menu item category master storage unit 230 and then receives the input of a selected choice.

The menu item introduction processing unit 203 extracts the template information of a corresponding menu item introduction from a menu item introduction master storage unit 231 of the menu item master storage unit 23 (described later) on the basis of the information of the selected category received by the menu item category input receiving unit 202, and then displays the template information. When the menu item introduction processing unit 203 has received a selection to change the menu item introduction, the menu item introduction processing unit 203 receives the input of a sentence that introduces a menu item in Japanese. The sentence that introduces a menu item includes how to eat the menu item, the characteristic of the menu item, the appeal point of the menu item, and the like.

The menu item introduction processing unit 203 may receive the input of a menu item introduction from the beginning without using the template information.

The menu item property processing unit 204 extracts the pieces of template information of corresponding representative ingredient, cooking style and seasoning from an ingredient master storage unit 232, seasoning master storage unit 233 and cooking style master storage unit 234 of the menu item master storage unit 23 (described later) on the basis of the information of the selected category received by the menu item category input receiving unit 202, and then displays the pieces of template information. When the menu item property processing unit 204 has received a selection to change the menu item properties, the menu item property processing unit 204 receives the input of selected representative ingredient, cooking style, seasoning, and the like, of the menu item by consulting the ingredient master storage unit 232, the seasoning master storage unit 233, and the cooking style master storage unit 234. Menu item properties to be selected are respectively stored in the ingredient master storage unit 232, seasoning master storage unit 233, cooking style master storage unit 234, and the like, of the menu item master storage unit 23 (described later). The menu item property processing unit 204 receives the input of the selected menu item properties by consulting these master storage units and displaying choices. The menu item properties include a typical ingredient, a cooking style, a seasoning, and the like; however, the menu item properties are not limited to them. The menu item properties may be set as needed.

The menu item property processing unit 204 may receive the input of selected menu item properties by consulting the master storage units from the beginning without using the pieces of template information.

The representative ingredient includes, for example, the characteristic or kind of a fish that is used in a menu item, the characteristic or kind of a meat that is used in a menu item, the characteristic or kind of a vegetable that is used in a menu item, and the like. The cooking style includes information indicating how an ingredient is cooked, such as baking, boiling, steaming and frying. The seasoning includes a seasoning that is used in a menu item.

When the sentence that introduces a menu item is changed by the menu item introduction processing unit 203 and the input of the changed sentence has been received, the automatic translation unit 205 translates the changed sentence into a sentence in a foreign language with the use of a known translation processing function. Various translation functions may be used. Other than the function of translating a sentence on a website, a function specific to a translation associated with cooking may be used.

The input information foreign-language word conversion unit 206 automatically converts information received by the menu item category input receiving unit 202, the menu item introduction processing unit 203 and the menu item property processing unit 204 to corresponding foreign-language words on the basis of a correspondence table between words in Japanese, which is the first language, and words in at least one foreign language, which is the second language. The correspondence table is stored in a corresponding foreign-language term storage unit 236 of the menu item master storage unit 23 (described later).

The menu item information processing unit 20 may receive the input of the price information of a menu item.

The menu item information storage unit 21 stores pieces of information in the menu item information processing unit 20 as menu item information for each restaurant.

When the menu item information display unit 22 has received a request to display menu item information from any one of the restaurant terminals 3 or a computer that is used by a guest, the menu item information display unit 22 extracts the menu item information of the corresponding restaurant from the menu item information storage unit 21 and then displays the menu item information.

The menu item master storage unit 23 stores pieces of information required to generate a foreign-language menu in the respective master tables in the menu item information processing unit 20. The menu item master storage unit 23 includes the menu item category master storage unit 230, the menu item introduction master storage unit 231, the ingredient master storage unit 232, the seasoning master storage unit 233, the cooking style master storage unit 234, and the corresponding foreign-language term storage unit 235.

The menu item category master storage unit 230 stores information of categories that are choices to receive the input of a selected category of a food menu item by the menu item category input receiving unit 202. Categories are stored by hierarchical structure as described above. For example, categories are stored so as to be classified into a large classification, a middle classification narrower than the large classification, and a small classification further narrower than the middle classification. The large classification includes, for example, Japanese food, Italian food, French food, Spanish food, Chinese food, and the like. The middle classification includes, for example, sushi, seafood, teppanyaki, izakaya, and the like, when the large classification is Japanese food. The small classification includes, for example, sashimi, seafood bowl, boiled fish, grilled fish, and the like, when the middle classification is seafood. In this way, the menu item category input receiving unit 202 is able to receive the input of a selected category by displaying choices on the basis of the categories stored in the menu item category master storage unit 230.

The menu item introduction master storage unit 231 stores the template information of a menu item introduction corresponding to the category selected by the menu item category input receiving unit 202. That is, each category and the template of a corresponding one of the menu item introductions are stored in association with each other. For example, the sentence "Sashimi (sashimi) is a Japanese food to eat it with a seasoning, such as soy sauce and vinegared miso, added with a condiment, such as horse radish and ginger, by cutting a raw ingredient, such as fish and shellfish, into small pieces." is stored as the template of the menu item introduction in association with the category "sashimi". Therefore, when the category "sashimi" has been selected, the menu item introduction processing unit 203 extracts the template information of the menu item introduction corresponding to "sashimi", stored in the menu item introduction master storage unit 231, and then displays the template information.

The ingredient master storage unit 232 stores information of ingredients that are choices to receive the input of a selected ingredient of a food menu item by the menu item property processing unit 204. Information of each ingredient may be stored in association with information of a category, or the menu item property processing unit 204 may extract an ingredient corresponding to the category selected by the menu item category input receiving unit 202 by consulting the ingredient master storage unit 232, and then display the extracted ingredient as the template information of the ingredient.

The seasoning master storage unit 233 stores information of seasonings that are choices to receive the input of a selected seasoning that is used in a food menu item by the menu item property processing unit 204. Information of each seasoning may be stored in association with information of a category, or the menu item property processing unit 204 may extract a seasoning corresponding to the category selected by the menu item category input receiving unit 202 by consulting the seasoning master storage unit 233, and then display the extracted seasoning as the template information of the seasoning.

The cooking style master storage unit 234 stores information of cooking styles that are choices to receive the input of a selected cooking style of a food menu item by the menu item property processing unit 204. Information of each cooking style may be stored in association with information of a category, or the menu item property processing unit 204 may extract a cooking style corresponding to the category selected by the menu item category input receiving unit 202 by consulting the cooking style master storage unit 234, and then display the extracted cooking style as the template information of the cooking style.

The ingredient master storage unit 232, the seasoning master storage unit 233, and the cooking style master storage unit 234 are collectively referred to as menu item property master storage unit.

The corresponding foreign-language term storage unit 235 is a correspondence table between Japanese (first language) and at least one foreign language (second language) for the category of a menu item to receive the input by the menu item category input receiving unit 202, the template information of an introduction to receive by the menu item introduction processing unit 203, the template information of the menu item properties, such as a representative ingredient, a cooking style and a seasoning, to receive by the menu item property processing unit 204, and the like.

Figure 5:
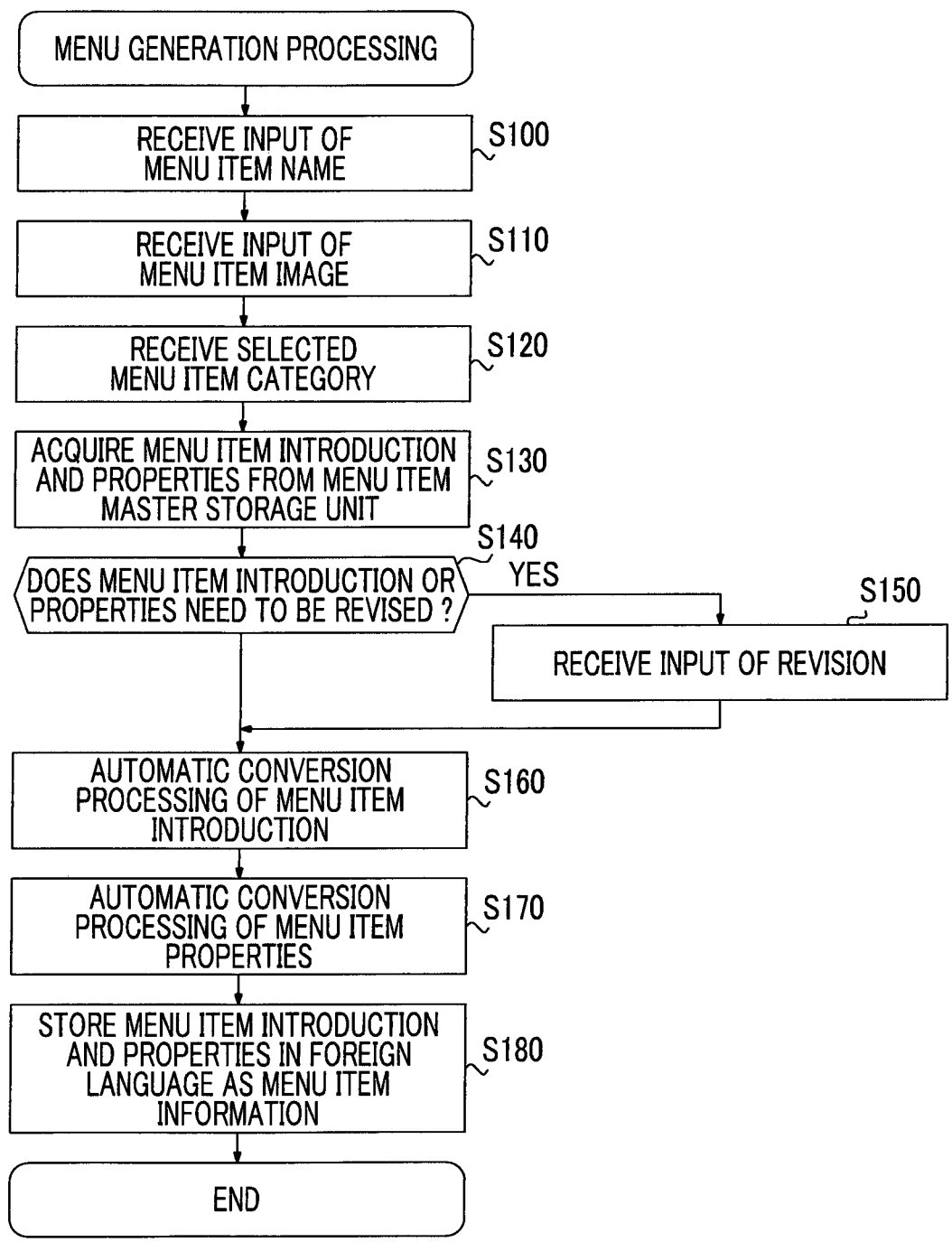
FIG. 5 is a flowchart that schematically shows an example of the processing process of the menu generation system according to the first embodiment of the invention.

Next, an example of the processing process of the menu generation system 1 according to the first embodiment of the invention will be described with reference to the flowchart shown in FIG. 5.

A restaurant that desires to display a foreign-language menu accesses to the menu generation system 1 of a company that manages an information providing service for restaurants through predetermined operation, and makes input operation for generating the foreign-language menu.

When the administrative server 2 receives the input operation, the menu item information processing unit 20 causes the corresponding restaurant terminal 3 to display a management window shown in FIG. 6, and prompts the input of menu item information on the restaurant terminal 3. Initially, the menu item name input receiving unit 200 of the menu item information processing unit 20 receives the input of a menu item name on the management window (S100). The menu item name input receiving unit 200 receives the input of a menu item name in Japanese and in katakana. The menu item name input receiving unit 200 converts the menu item name in Japanese to the menu item name in Roman alphabet on the basis of the received menu item name in katakana. Instead of the menu item name in katakana, the menu item name input receiving unit 200 may receive the input of the menu item name in Roman alphabet. In this case, conversion from the menu item name in katakana to the menu item name in Roman alphabet is not required.

For example, when the menu item is "Maguronoakafujimori", the menu item name input receiving unit 200 receives "まぐろの赤富士盛り(Maguronoakafujimori in Japanese)" and "マグロノアカフジモリ(Maguronoakafujimori in katakana)" as a menu item name. The menu item name input receiving unit 200 converts the menu item name in Japanese to "MAGURONOAKAFUJIMORI" on the basis of "マグロノアカフジモリ(Maguronoakafujimori in katakana)". FIG. 7 shows an example of the management window in the case where the menu item name is input.

Figure 8:
FIG. 8 is a view that schematically shows an example of a state where a menu item image is input into the management window.

Subsequently, when "UPLOAD" button for uploading an image is selected in the management window, a window for uploading the image information of the menu item is displayed. Then, when image information to be uploaded is selected, the image information of the menu item is transmitted from the restaurant terminal 3 to the administrative server 2. The menu item image input receiving unit 201 of the menu item information processing unit 20 receives the input of the image information of the menu item (S110). FIG. 8 shows an example of the management window in the case where a menu item image is input.

When "SELECT CATEGORY" button is selected on the management window in the restaurant terminal 3, the menu item category input receiving unit 202 of the menu item information processing unit 20 receives the fact that "SELECT CATEGORY" button has been selected. The menu item category input receiving unit 202 consults the menu item category master storage unit 230 in the menu item master storage unit 23, and displays the choices of the menu item category on the management window. A manner of displaying choices includes various manners, such as a manner using a pull-down menu, a manner using checkboxes, and a manner using a pop-up window. Any manner may be employed.

Figure 9:
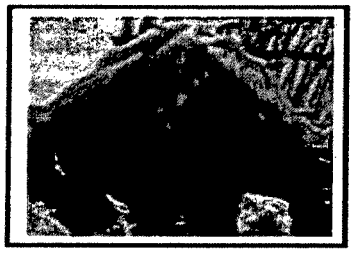
FIG. 9 is a view that schematically shows an example of a state where a menu item category is input into the management window.

For example, if "sashimi" is selected within "seafood" (middle classification) of "Japanese food" (large classification), the menu item category input receiving unit 202 receives the input of the selection (S120). FIG. 9 shows an example of the management window in the case where a menu item category is input.

Figure 10:
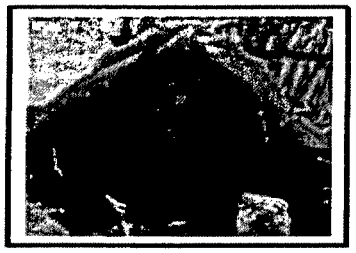
FIG. 10 is a view that schematically shows an example of a state where a menu item introduction and menu item properties are incorporated into the management window.

When the menu item category input receiving unit 202 receives a selected menu item category, the menu item introduction processing unit 203 and the menu item property processing unit 204 acquire the pieces of template information respectively corresponding to the menu item introduction and menu item properties, such as an ingredient, a seasoning and a cooking style, corresponding to the selected menu item category by consulting the menu item introduction master storage unit 231, the ingredient master storage unit 232, the seasoning master storage unit 233 and the cooking style master storage unit 234 in the menu item master storage unit 23 (S130). The menu item introduction processing unit 203 and the menu item property processing unit 204 display those pieces of template information on the management window. FIG. 10 shows an example of the management window in the case where the pieces of template information of the menu item introduction and menu item properties are displayed.

If the pieces of template information of the menu item introduction and menu item properties need to be revised (S140), edition is allowed by selecting "EDIT" in menu item introduction, "EDIT INGREDIENT", "EDIT SEASONING" or "EDIT COOKING STYLE", and the input is received (S150). At this time, the menu item introduction processing unit 203 receives free input of the menu item introduction in Japanese. On the other hand, as for the menu item properties, that is, the ingredient, seasoning and cooking style, when a selection of "EDIT INGREDIENT", "EDIT SEASONING", or "EDIT COOKING STYLE" is received, the menu item property processing unit 204 consults the ingredient master storage unit 232, the seasoning master storage unit 233 OR the cooking style master storage unit 234 in the menu item master storage unit 23, displays corresponding choices on the management window, and then receives the input of a selected choice.

As described above, the input of the menu item name, menu item introduction, menu item properties, or the like, is received as menu item information. When the details are revised by the menu item introduction processing unit 203, the automatic translation unit 205 executes the process of automatically translating the Japanese menu item introduction received by the menu item introduction processing unit 203 into the menu item introduction in a predetermined foreign language, such as English, French, German, Spanish, Chinese and Arabic (S160). On the other hand, when no revision is made, the input information foreign-language word conversion unit 206 executes automatic conversion processing by searching the corresponding foreign-language term storage unit 235 for a foreign-language term corresponding to the menu item introduction and identifying the foreign-language term of the selected menu item introduction (S160).

In addition, the input information foreign-language word conversion unit 206 executes automatic conversion processing by consulting the corresponding foreign-language term storage unit 235 on the basis of the selections received by the menu item property processing unit 204 and identifying foreign-language words of the selected menu item properties (S170).

By executing the above-described processing, the menu item information processing unit 20 stores the menu item introduction and menu item properties in the foreign language in the menu item information storage unit 21 as the menu item information (S180).

Figure 11:
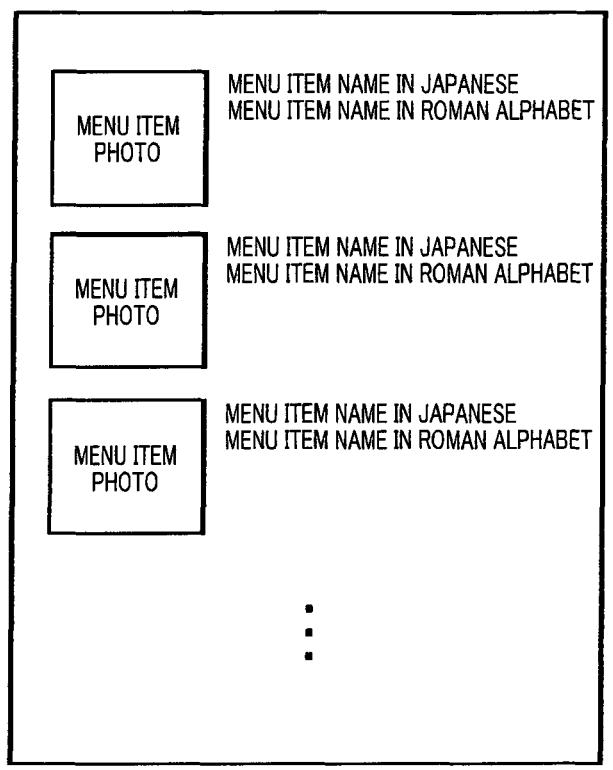
FIG. 11 is a view that schematically shows an example of a window in the case where a list of menu items is displayed by using the menu generation system according to the first embodiment of the invention.

When a foreigner has actually come to a restaurant, a staff of the restaurant accesses to the administrative server 2 through predetermined operation with a portable communication terminal, or the like, and hands the portable communication terminal to the foreigner. As the foreigner selects his or her own understandable language, or the like, with the portable communication terminal, the menu item information display unit 22 displays a list of menu items as shown in FIG. 11. In this case, information of a menu item name in Japanese and in Roman alphabet and information of the photo of a menu item should be displayed in a list form.

Figure 12:
FIG. 12 is a view that schematically shows an example of a window in the case where the detailed information of a menu item is displayed by using the menu generation system according to the first embodiment of the invention.

When a menu item name, or the like, is selected from the list, the portable communication terminal issues a request to acquire the menu item information to the administrative server 2. The menu item information display unit 22 displays the menu item information of the selected menu, corresponding to the language selected by the foreigner, from the menu item information storage unit 21. The menu item information includes, for example, information of the menu item name in Japanese and in Roman alphabet, information of an introduction automatically converted or automatically translated from the menu item introduction in the selected language, information of a menu explanation automatically converted from menu item properties, such as an ingredient, a seasoning and a cooking style, in the selected language, and the like. FIG. 12 shows an example of the displayed menu item information.

As described above, it is possible to provide a foreign-language menu by displaying the menu item information. The foreigner is allowed to directly order a desired menu item to the staff. In this case, because the menu item name is displayed in Roman alphabet that allows the foreigner to pronounce in Japanese and is not translated, the foreigner is allowed to order in Japanese pronunciation, and the staff is also able to listen to the order through pronunciation in Japanese. Therefore, it is less likely for a staff to erroneously listen to the details of an order.

Selected pieces of information are automatically converted, and the menu item properties shown in FIG. 12 are displayed in the selected language. Although a free expression is not allowed for each restaurant, menu item properties are allowed to be displayed by unified terms. Therefore, it is possible to provide information about an ingredient, a seasoning, a cooking style, and the like, to foreigners while keeping accuracy. Therefore, there is no writing that leads to ambiguity or misunderstanding, so it is possible to eliminate troubles, such as intake of ingredients that are subjects of taboos or restrictions due to religion, belief, health, or the like.

On the other hand, a menu item introduction allows free input at a restaurant, and the menu item introduction is allowed to be automatically translated. For this reason, room for conveying free feelings of a restaurant to a menu item is ensured. Therefore, it is also possible to keep ensuring the uniqueness of each restaurant.

The automatic translation processing of the automatic translation unit 205 or the automatic conversion processing of the input information foreign-language word conversion unit 206 may be not executed in advance but executed at any timing. For example, the processing may be executed when a foreigner has issued a request to display a corresponding menu item.

The input information foreign-language word conversion unit 206 may not display a foreign-language term corresponding to a selected menu item property. The input information foreign-language word conversion unit 206 may display foreign-language words corresponding to selectable menu item properties and then display a menu item property selected from among the menu item properties.

Figure 13:
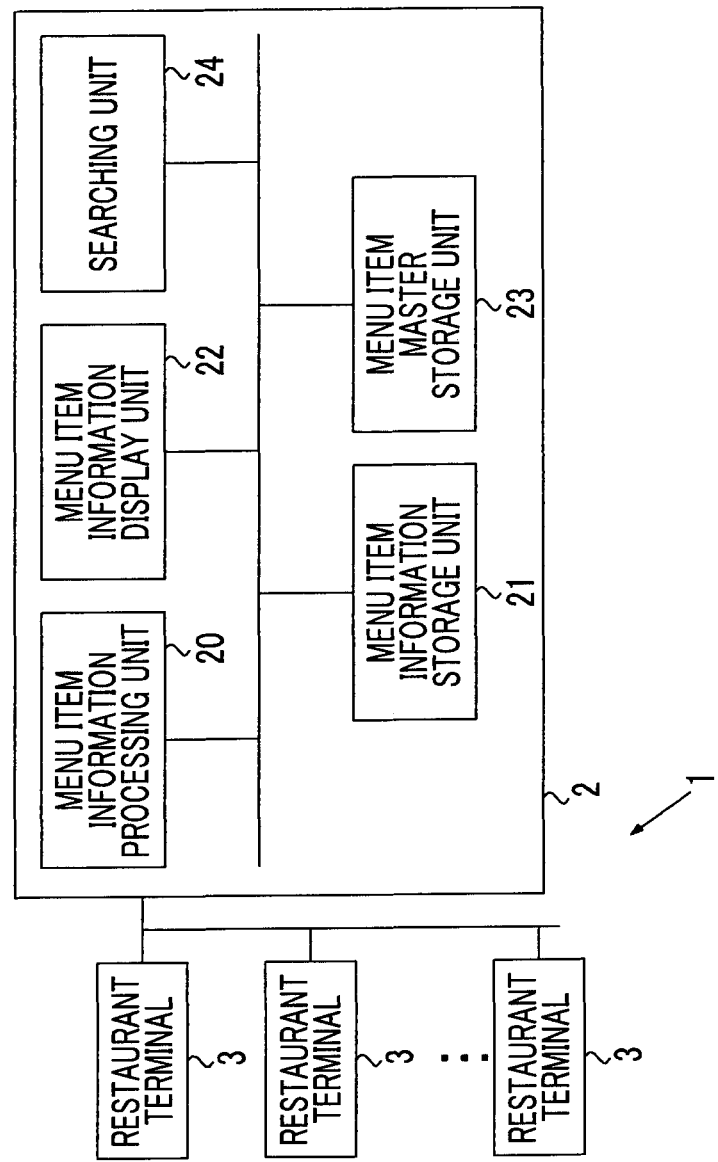
FIG. 13 is a conceptual view that schematically shows an example of the system configuration of a menu generation system according to a second embodiment of the invention.

In a second embodiment different from the first embodiment, a web server that is used by a restaurant information providing site may be linked with the menu item information storage unit 21, and at least any one of a menu item name, a menu item introduction or a menu item property may be received as a searching condition for searching for restaurants or menu items in the restaurant information providing site. In this case, as schematically shown in FIG. 13, the administrative server 2 includes a searching unit 24. The input of a searching condition to the web server that is used by the restaurant information providing site may be carried out from any one of the restaurant terminals 3 or a computer that is used by a guest.

The searching unit 24 identifies a foreign-language word corresponding to a searching condition (first searching condition) from the corresponding foreign-language term storage unit 235 on the basis of at least any one of the menu item name, the menu item introduction or the menu item property in the searching condition. The searching condition is input to the restaurant information providing site. The searching unit 24 adds the identified term to the searching condition (second searching condition), searches the menu item information storage unit 21 for restaurants including those terms, and returns the results to the restaurant information providing site.

For example, when the restaurant information providing site receives the input of "pork" as the searching condition, the searching unit 24 identifies a foreign-language word corresponding to the searching condition "pork" input to the restaurant information providing site, that is, "'豚肉" (Japanese), "猪肉" (Chinese), "schwein" (German), "porc" (French), or the like, from the corresponding foreign-language term storage unit 235. The searching unit 24 sets "pork", "'豚肉", "猪肉", "schwein", or "porc" as a new searching condition, searches the menu item information storage unit 21 for restaurants including the term in the menu item information, and returns appropriate restaurants to the restaurant information providing site as search results.

In this case, the pieces of menu item information of the restaurants to be displayed as the search results should be displayed as pieces of information in the same language as the language of the searching condition input to the restaurant information providing site (first searching condition). That is, even when the pieces of menu item information of the found restaurants include not the searching condition "pork" but the searching condition "豚肉" (second searching condition), it is desirable that not the Japanese menu item information be displayed but the English menu item information be extracted from the menu item information storage unit 21 and then displayed.

By providing the searching unit 24, it is possible to provide information about restaurants that provide appropriate menu items to foreigners via the restaurant information providing site. Particularly, when there are ingredients, and the like, which are subjects of taboos or restrictions due to the reason of religion or belief, it is possible to select a restaurant that satisfies the guidelines, and the like.

With the menu generation system 1 according to the embodiments of the invention, even when there is no staff who has a good command of a foreign language, it is possible to make a foreigner understand a menu item with a simple method. Because it is possible to accurately display an ingredient, a cooking style, and the like, on a menu, it is less likely to have a trouble with a guest. In addition, because a menu item name is displayed in writing that allows even a foreigner to pronounce the menu item name in the first language, it is less likely to make a wrong order.

The invention claimed is:

1. A menu generation system that generates a menu of a restaurant in multiple languages, comprising:
   memory configured to store:
   one or more menu item properties including at least any one set of a plurality of ingredients that are used in menu items, a plurality of seasonings that are used in the menu items, or a plurality of cooking styles of the menu items,
   a correspondence relation between each of the one or more menu item properties in a first language and a corresponding menu item property in at least one second language that is different from the first language, and
   the one or more menu item properties corresponding to a menu item category to which any one of the menu item belongs; and
   processing circuitry configured to:
   provide, via a network to a display of an information terminal that is used at the restaurant, a menu generation management window in the first language for generating a menu in the second language, the menu generation management window including first through fourth areas, the first area including a menu item name input area, the second area including a menu item image input area, the third area including a menu item category input area, and the fourth area including a menu item property input area,
   receive, via the network from the information terminal, input of a menu item name in the first language through the menu item name input area in the menu generation management window on the information terminal,
   provide, via the network to the display of the information terminal, a graphical representation of a menu item image input operation section in the second area,
   receive, via the network from the information terminal, input of an operation of the graphical representation of the menu item image input operation section,
   provide, via the network to the display of the information terminal, a graphical representation of a menu item category input operation section in the third area,
   receive, via the network from the information terminal, input of an operation of the graphical representation of the menu item category input operation section,
   provide, via the network to the display of the information terminal, a plurality of the menu item categories displayable as a first plurality of selectable choices in the first language in the menu item category input area in response to the receipt of the input of the operation of the graphical representation of the menu item category input operation section,
   receive, via the network from the information terminal, input of a selection of a menu item category in the first language from the plurality of the menu item categories displayed as the first plurality of selectable choices in the first language in the menu item category input area of the menu generation management window,
   extract, from the memory, choices of available menu item properties in the first language included in the one or more menu item properties corresponding to the selected menu item category in the first language in response to the receipt of the input of the selection of the menu item category in the first language, each extracted choice of the menu item properties having the correspondence relation between the first language and the at least one second language stored in the memory,
   provide, via the network to the information terminal, the extracted choices of the available menu item properties in the first language displayable as a second plurality of selectable choices in the first language in the menu item property input area of the menu generation management window,
   receive, via the network from the information terminal, input of a selection of a menu item property in the first language from among the choices of the menu item properties displayed as the second plurality of selectable choices in the first language in the menu item property input area of the menu generation management window on the information terminal,
   automatically determine the menu item property in the second language corresponding to the selected menu item property in the first language on the basis of the correspondence relation in response to the receipt of the input of the selection of the menu item property in the first language,
   store the received menu item name in the first language and the determined menu item property in the second language in the memory, and
   generate the menu including the received menu item name in the first language, the menu item image, the selected menu item category in the second language, and the determined menu item property in the second language.

2. The menu generation system according to claim 1, wherein
   the memory is further configured to:
   store a menu item introduction in the first language in association with the menu item category, and
   store a correspondence relation between the menu item introduction in the first language and the menu item introduction in the second language, and
   the processing circuitry is further configured to:
   extract the menu item introduction in the first language corresponding to the selected menu item category in the first language from the memory,
   receive the extracted menu item introduction in the first language as the menu item introduction in the first language,
   convert the received menu item introduction in the first language to the menu item introduction in the second language on the basis of the correspondence relation, and
   store the converted menu item introduction in the second language with the received menu item name in the first language and the determined menu item property in the second language in the memory as menu item information.

3. The menu generation system according to claim 2, wherein the processing circuitry is further configured to:
   receive, from the information terminal, a revision to the received menu item introduction in the first language,
   automatically translate, when the revision to the received menu item introduction in the first language is received, the received menu item introduction to the menu item introduction in the second language, and
   instruct, when the revision to the received menu item introduction in the first language is received, display of the automatically translated menu item introduction in the second language as the menu item introduction included in the menu item information.

4. The menu generation system according to claim 3, wherein the processing circuitry is further configured to:
receive a request to edit the selected menu item property in the first language from the information terminal,
extract, when the request to edit the selected menu item property is received, the choices of the available menu item properties in the first language by consulting the memory,
receive input of a selection of one of the extracted choices in the first language from the information terminal,
determine a menu item property in the second language corresponding to the selected one of the extracted choices in the first language on the basis of the correspondence relation, and
instruct, when the selection of the one of the extracted choices in the first language is received, display of the determined menu item property in the second language corresponding to the selected one of the extracted choices as the determined menu item property included in the menu item information.

5. The menu generation system according to claim 2, wherein the processing circuitry is further configured to:
receive a request to edit the selected menu item property in the first language from the information terminal,
extract, when the request to edit the selected menu item property is received, the choices of the available menu item properties in the first language by consulting the memory,
receive input of a selection of one of the extracted choices in the first language from the information terminal,
determine a menu item property in the second language corresponding to the selected one of the extracted choices in the first language on the basis of the correspondence relation, and
instruct, when the selection of the one of the extracted choices in the first language is received, display of the determined menu item property in the second language corresponding to the selected one of the extracted choices as the determined menu item property included in the menu item information.

6. The menu generation system according to claim 1, wherein
the processing circuitry is further configured to generate writing that allows a foreigner to pronounce the menu item name in the first language, and
the menu includes the writing.

7. The menu generation system of claim 1, wherein the processing circuitry is further configured to:
identify a foreign language word corresponding to a searching condition input to a restaurant information providing site from a language correspondence relation on the basis of a menu item property in the first language in the searching condition,
add the foreign language word in the second language to the searching condition,
search for restaurants with the searching condition, and
return the searched restaurants to the restaurant information providing site as search results.

8. A menu generation method for generating a menu of a restaurant in multiple languages, comprising:
storing, in a memory, one or more menu item properties including at least any one set of a plurality of ingredients that are used in menu items, a plurality of seasonings that are used in the menu items, or a plurality of cooking styles of the menu items;
storing, in the memory, a correspondence relation between each of the one or more menu item properties in a first language and a corresponding menu item property in at least one second language that is different from the first language;
storing, in the memory, the one or more menu item properties corresponding to a menu item category to which any one of the menu item belongs;
provide, via a network to a display of an information terminal that is used at the restaurant, a menu generation management window in the first language for generating a menu in the second language, the menu generation management window including first through fourth areas, the first area including a menu item name input area, the second area including a menu item image input area, the third area including a menu item category input area, and the fourth area including a menu item property input area,
receiving, via the network from the information terminal, input of a menu item name in the first language through the menu item name input area in the menu generation management window on the information terminal;
providing, via the network to the display of the information terminal, a graphical representation of a menu item image input operation section in the second area;
receiving, via the network from the information terminal, input of an operation of the graphical representation of the menu item image input operation section;
providing, via the network to the display of the information terminal, a graphical representation of a menu item category input operation section in the third area;
receiving, via the network from the information terminal, input of an operation of the graphical representation of the menu item category input operation section;
providing, via the network to the display of the information terminal, a plurality of the menu item categories displayable as a first plurality of selectable choices in the first language in the menu item category input area in response to the receipt of the input of the operation of the graphical representation of the menu item category input operation section;
receiving, via the network from the information terminal, input of a selection of a menu item category in the first language from the plurality of the menu item categories displayed as the first plurality of selectable choices in the first language in the menu item category input area of the menu generation management window;
extracting, from the memory, choices of available menu item properties in the first language included in the one or more menu item properties corresponding to the selected menu item category in the first language in response to the receipt of the input of the selection of the menu item category in the first language, each extracted choice of the menu item properties having the correspondence relation between the first language and the at least one second language stored in the memory;
providing, via the network to the information terminal, the extracted choices of the available menu item properties in the first language displayable as a second plurality of selectable choices in the first language in the menu item property input area of the menu generation management window;
receiving, via the network from the information terminal, input of a selection of a menu item property in the first language from among the choices of the menu item properties displayed as the second plurality of selectable choices in the first language in the menu item property input area of the menu generation management window on the information terminal, automatically determining the menu item property in the second language corresponding to the selected menu item property in the first language on the basis of the correspondence relation in response to the receipt of the input of the selection of the menu item property in the first language;

storing the received menu item name in the first language and the determined menu item property in the second language in the memory; and generating the menu including the received menu item name in the first language, the menu item image, the selected menu item category in the second language, and the determined menu item property in the second language.

9. The menu generation method according to claim 8, further comprising:

storing, in the memory, a menu item introduction in the first language in association with the menu item category;

storing, in the memory, a correspondence relation between the menu item introduction in the first language and the menu item introduction in the second language;

extracting the menu item introduction in the first language corresponding to the selected menu item category from the memory;

receiving the extracted menu item introduction in the first language as the menu item introduction in the first language;

converting the received menu item introduction in the first language to the menu item introduction in the second language on the basis of the correspondence relation; and storing the converted menu item introduction in the second language with the received menu item name in the first language and the determined menu item property in the second language in the memory as menu item information.

10. The menu generation method according to claim 9, further comprising:

receiving, from the information terminal, a revision to the received menu item introduction in the first language;

automatically translating, when the revision to the received menu item introduction in the first language is received, the received menu item introduction to the menu item introduction in the second language; and instructing, when the revision to the received menu item introduction in the first language is received, display of the automatically translated menu item introduction in the second language as the menu item introduction included in the menu item information.

11. The menu generation method according to claim 10, further comprising:

receiving a request to edit the selected menu item property in the first language from the information terminal;

extracting, when the request to edit the selected menu item property is received, the choices of the available menu item properties in the first language by consulting the memory, receiving input of a selection of one of the extracted choices in the first language from the information terminal;

determining a menu item property in the second language corresponding to the selected one of the extracted choices in the first language on the basis of the correspondence; and instructing, when the selection of the one of the extracted choices in the first language is received, display of the determined menu item property in the second language corresponding to the selected one of the extracted choices as the determined menu item property included in the menu item information.

12. The menu generation method according to claim 9, further comprising:

receiving a request to edit the selected menu item property in the first language from the information terminal;

extracting, when the request to edit the selected menu item property is received, the choices of the available menu item properties in the first language by consulting the memory;

receiving input of a selection of one of the extracted choices in the first language from the information terminal;

determining a menu item property in the second language corresponding to the selected one of the extracted choices in the first language on the basis of the correspondence relation; and instructing, when the selection of the one of the extracted choices in the first language is received, display of the determined menu item property in the second language corresponding to the selected one of the extracted choices as the determined menu item property included in the menu item information.

13. The menu generation method according to claim 8, further comprising:

generating writing that allows a foreigner to pronounce the menu item name in the first language, wherein the menu includes the writing.

* * * * *